Sept. 20, 1955
M. A. BURSKEY
2,718,404
EXPANSIBLE CART
Filed Oct. 8, 1954
2 Sheets-Sheet 1
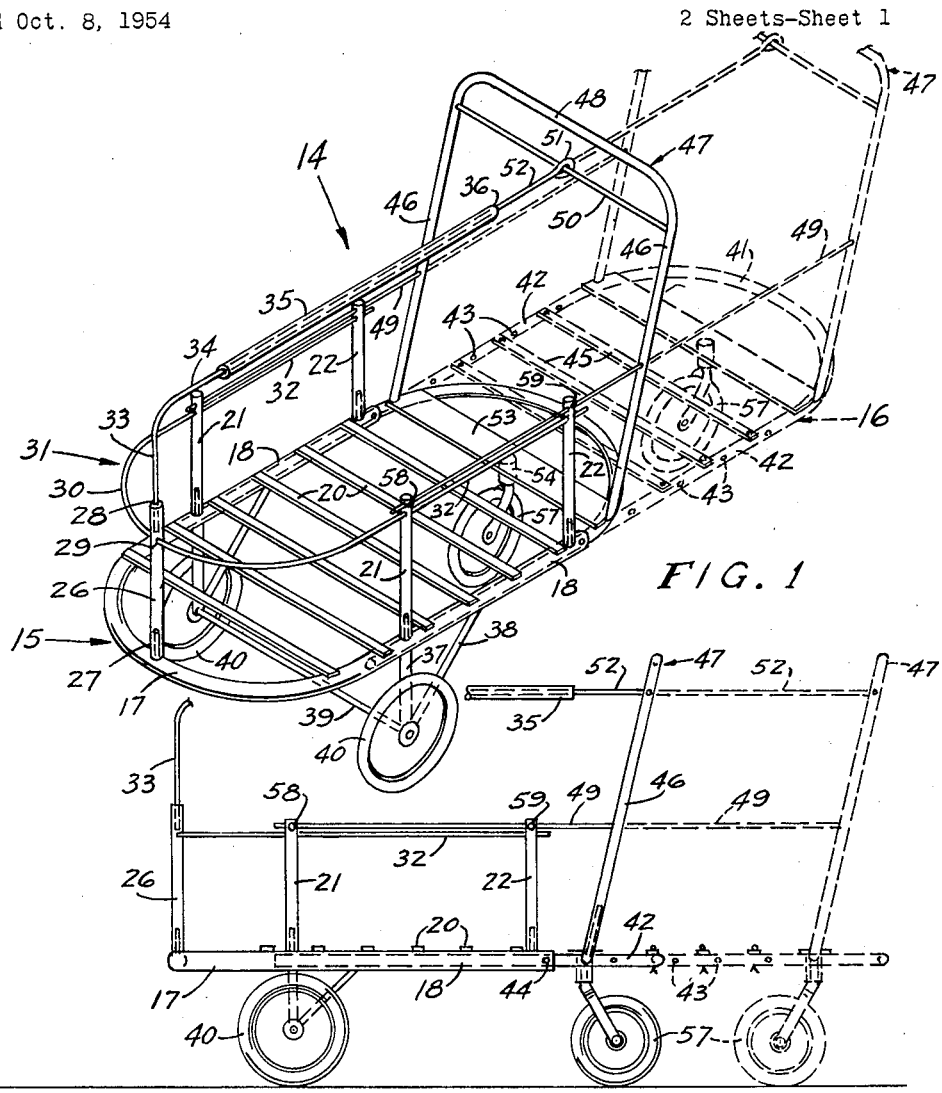
FIG. 1
FIG. 2
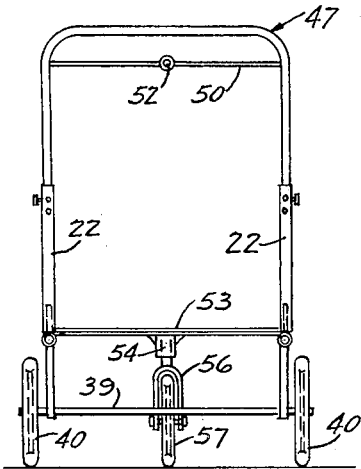
FIG. 3
MICHAEL A. BURSKEY
INVENTOR.
BY
McMorrow, Berman & Davidson
ATTORNEYS Sept. 20, 1955   M. A. BURSKEY   2,718,404
EXPANSIBLE CART
Filed Oct. 8, 1954   2 Sheets-Sheet 2
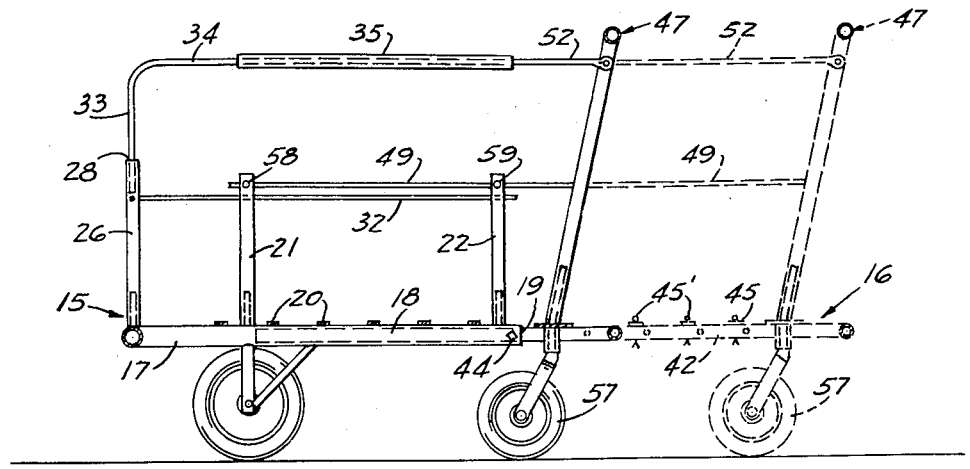
FIG. 4
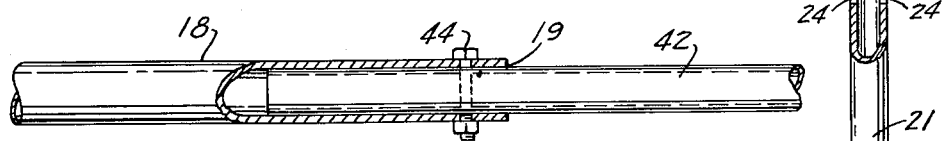
FIG. 5
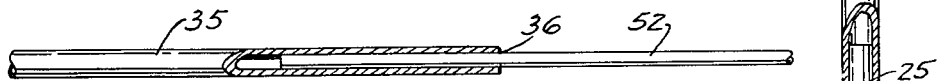
FIG. 6
FIG. 7
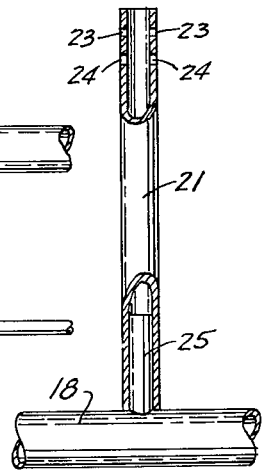
FIG. 8
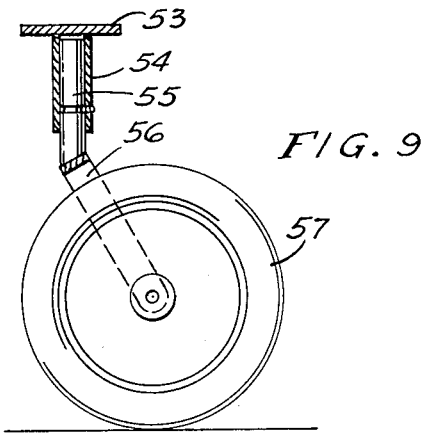
FIG. 9
MICHAEL A. BURSKEY
INVENTOR.
BY
McMorrow, Berman & Davidson
ATTORNEYS

2,718,404
EXPANSIBLE CART
Michael A. Burskey, Toronto, Ohio

Application October 8, 1954, Serial No. 461,153

4 Claims. (Cl. 280—34)

This invention relates to a novel expansible cart composed of sections which are longitudinally adjustable relative to each other for increasing or decreasing the carrying capacity of the cart.

The primary object of the invention is to provide a cart of the character indicated above which is efficient, rugged, and practical and which is composed of a minimum number of simple parts.

Another important object of the invention is the provision of a cart of the character indicated above which comprises a front section having fixed ground engaging wheels, and a rear section which is longitudinally adjustable relative to the front section and has a swivel caster ground engaging wheel, and handle means for moving and guiding the cart over the ground.

A further important object of the invention is to provide a cart of the character indicated above which can be easily made in a serviceable and attractive form at relatively low cost.

Other important objects and advantageous features of the invention will be apparent from the following description and the accompanying drawings, wherein, for purposes of illustration only, a specific embodiment of the invention is set forth in detail.

In the drawings:

Figure 1 is a front perspective view, showing the embodiment in contracted position in full lines and n expanded position in phantom lines;

Figure 2 is a left hand side elevation showing the embodiment in contracted and expanded positions and partly broken away;

Figure 3 is a rear end elevation;

Figure 4 is a view similar to Figure 2, showing the caster wheel in reversed positions;

Figure 5 is an enlarged fragmentary top plan view of one of the side members of the frame, partly broken away to show components thereof;

Figure 6 is a similar view of the cover holding member, partly broken away to show components thereof;

Figure 7 is a similar view of one of the rear section frame side members, partly broken away;

Figure 8 is a fragmentary side elevation of one of the side rail supports and associated frame side member, partly broken away to show structure; and Figure 9 is a side elevation, partly in vertical transverse section, of the caster wheel and its mounting.

Referring in detail to the drawings, wherein like numerals designate like parts throughout the several views, the illustrated cart, generally designated 14, comprises a front section 15 and a rear section 16.

The front section 15 comprises a horizontal U-shaped frame having an arcuate front cross member or bight portion 17 and legs or side members 18, 18. The side members 18, 18 are parallel, are tubular, and have open rear ends 19, 19.

Extending across the front section frame and fixed to the side members 18, 18 at longitudinally spaced intervals are slats or bars 20, constituting the load carrying platform of the front section 15.

Fixed to and rising perpendicularly from each side member 18 adjacent to the front and rear ends thereof, are front and rear tubular standards or posts 21 and 22, respectively, having horizontally and longitudinally aligned pairs of upper and lower holes 23, 23 and 24, 24 respectively, at their upper ends.

The posts 21 and 22 are preferably tubular, and, as shown in Figure 8, secured at their lower ends to the frame side members 8 by being telescoped onto and fixed to bosses 25 fixed to and rising from the side members 18.

A single front tubular post or standard 26 is fixed to and rises from the center of the frame bight portion 17, as indicated at 27 and is secured in place like the posts 21 and 22 and has an open upper end 28. The single post 26 has near its upper end a pair of transverse aligned holes 29 through which extends the curved bight portion 30 of a U-shaped front guard rail 31. The front guard rail 31 has legs 32, 32 which extend rearwardly through the lower pairs of holes 24, 24 of the posts 21 and 22.

Inserted in and secured in the open upper end 28 of the single posts 26 is the downturned front end portion 33 of a horizontal rearwardly extending canopy or cover supporting rod 34 having telescoped and fixed thereon a horizontal tubular sleeve 35 having an open rear end 36 positioned at the rear end of the front section 15. This provides for covering the cart 14 with a canopy or cover if desired.

Fixed to and depending from forward portions of the front section frame side members 18 are vertical axle brackets 37, 37 braced to the side members 18 by diagonal braces 38, 38. An axle 39 extends across the front section 15 through the lower ends of the brackets 37, 37 and carries ground engaging wheels 40, 40 at the outer sides of these brackets.

The rear cart section 16 comprises a U-shaped frame having an arcuate rear end cross member or bight portion 41 and forwardly extending parallel side members 42, 42 which are smaller in diameter than the side members 18, 18 of the front cart section 15 and are slidably engaged at their front ends in the open rear ends 19 of the front section side members 18, 18 as shown in Figure 4 of the drawings.

The side members 42, 42 of the rear section frame are provided with longitudinally spaced holes 43, and rear end portions of the front section side members are traversed by bolts 44, 44 which are adapted to engage through selected ones of holes 43 in the rear cart section side members 42, 42 so as to secure the rear section 16 in selected longitudinal adjustment relative to the front section 15.

The rear car section frame has transverse, longitudinally spaced slats or bars 45 which are removably secured, as indicated at 45', to the rear section side members 42, 42 and provide a load carrying platform for the rear section 16. The slats 45 are removable so that they will not engage the front section 15 and prevent contracting the rear section 16 relative to the front section.

Fixed to and rising from rear end portions of the rear section frame side members 42, 42 are rearwardly and upwardly inclined legs 46, 46 of an inverted U-shaped handle 47, having a horizontal and relatively straight hand grip or bight portion 48 secured to and extending between the upper ends of the legs 46, 46.

Side rails 49, 49 are slidably positioned through the upper pairs of holes 23, 23 in the front section posts 21, 22 and are fixed at their rear ends to the handle legs 46, 46.

A transverse cross bar 50 is parallel to and spaced below the handle grip 48 and is secured at its ends to the handle legs 46, 46. Loosely encircling an intermediate part of the cross bar 50 is an eye 51 on the rear end of a rear cover or canopy supporting rod 52 having its forward end slidably telescoped in the sleeve 35.

A cross member 53 extending across the rear section frames and fixed to the side members 42, 42 has a central perpendicular depending socket 54, in which is journalled the vertical spindle 55 of a caster wheel clevis 56. The clevis 56 is canted and at its lower end carries a single caster wheel 57.

It will be evident from the foregoing that, with the cart 14 in an expanded condition, as shown in phantom lines in Figures 1, 2 and 4, contraction of the cart 14 is accomplished by loosening and removing the bolts 44 on the rear ends of the front section frame side members 18, 18, by removing the slots 45, and while holding the front section 15 stationary, pushing the rear section forwardly, to the desired extent. The bolts 44 are then replaced in the front section frame side members 18 so as to engage through selected holes 43 in the rear section frame side members 42, 42.

The foregoing operations are accompanied by loosening and then retightening set screws 58 and 59 in the front and rear posts 21 and 22 of the front section 15, first to permit the side rails 49, 49 to slide forwardly through the posts 21 and 22 and then to lock these rails in their new positions.

Expansion of the cart 14 is done by reversing the above described operations.

The embodiment of the invention described above especially, but not exclusively, contemplates use of the disclosed cart for garbage cans. The capacity of the front section 15 is preferably two garbage cans, and the capacity of the rear section one garbage can and/or other receptacles. The cart, when stationed at a house, serves as a protective stand for garbage cans, and the side rails 32 and 49 and the front rail 30 prevent dogs and children from tipping over the cans. At collection time, the cart, loaded with garbage cans, can be easily rolled to the place of collection and the emptied cans returned thereon to the house.

What is claimed is:

1. In an expansible cart, a front section and a rear section, said front section having a frame having rear portions, said rear section having a frame having forward portions, said front and rear frame portions being slidably engaged and confined to forward and rearward movements relative to each other, a pair of ground engaging wheels fixed on and depending from the front section frame, a swivel caster wheel fixed on and depending from said rear section frame, said front section frame and said rear section frame having transverse spaced longitudinal side members, the side members of the front section frame and the side members of the rear section frame being tubular and telescopically engaged, the side members of the front section frame having thereon fixed longitudinally spaced standards, said standards having upper and lower holes therethrough, a fixed front guard rail assembly comprising front horizontal side guard rails extending through holes of the standards, rear horizontal guard rails fixed to said handle means and extending slidably through the other holes of the posts.

2. In an expansible cart, a front section and a rear section, said front section having a frame having rear portions, said rear section having a frame having forward portions, said front and rear frame portions being slidably engaged and confined to forward and rearward movements relative to each other, a pair of ground engaging wheels fixed on and depending from the front section frame, a swivel caster wheel fixed on and depending from said rear section frame, said front section frame and said rear section frame having transverse spaced longitudinal side members, the side members of the front section frame and the side members of the rear section frame being tubular and telescopically engaged, the side members of the front section frame having thereon fixed longitudinally spaced standards, said standards having upper and lower holes therethrough, a fixed front guard rail assembly comprising front horizontal side guard rails extending through holes of the standards, rear horizontal guard rails fixed to said handle means and extending slidably through the other holes of the posts, said front guard rail assembly comprising a front post fixed on and rising from a front part of the front section frame, and a front rail secured to the front post and integral with the front side guard rails.

3. In an expansible cart, a front section and a rear section, said front section having a frame having rear portions, said rear section having a frame having forward portions, said front and rear frame portions being slidably engaged and confined to forward and rearward movements relative to each other, a pair of ground engaging wheels fixed on and depending from the front section frame, a swivel caster wheel fixed on and depending from said rear section frame, said front section frame and said rear section frame having transverse spaced longitudinal side members, the side members of the front section frame and the side members of the rear section frame being tubular and telescopically engaged, the side members of the front section frame having thereon fixed longitudinally spaced standards, said standards having upper and lower holes therethrough, a fixed front guard rail assembly comprising front horizontal guard rails fixed to said handle means and extending slidably through the other holes of the posts, first releasable locking means acting between the frame side members of the front and rear section frames locking the sections in selected longitudinal adjustment relative to each other, and second releasably locking means acting between the front and rear posts of the front section and said rear horizontal guard rails.

4. In an expansible cart, a front section and a rear section, said front section having a frame having rear portions, said rear section having a frame having forward portions, said front and rear frame portions being slidably engaged and confined to forward and rearward movements relative to each other, a pair of ground engaging wheels fixed on and depending from the front section frame, a swivel caster wheel fixed on and depending from said rear section frame, said front section frame and said rear section frame having transverse spaced longitudinal side members, the side members of the front section frame and the side members of the rear section frame being tubular and telescopically engaged, the side members of the front section frame having thereon fixed longitudinally spaced standards, said standards having upper and lower holes therethrough, a fixed front guard rail assembly comprising front horizontal side guard rails extending through holes of the standards, rear horizontal guard rails fixed to said handle means and extending slidably through the other holes of the posts, a single front post fixed to and rising from a front part of the front section frame, a front canopy supporting rod having a forward end fixed to said single post and a rearward end, a sleeve fixed on said rearward end having an open rear end, a rear canopy supporting rod on said handle means having a forward end slidably telescoped in the open rearward end of the sleeve.

References Cited in the file of this patent

UNITED STATES PATENTS

| 1,016,381 | Watson | Feb. 6, 1912 |
| 2,439,851 | Higgins | Apr. 20, 1948 |
| 2,571,456 | Kolln | Oct. 16, 1951 |